Oct. 10, 1950     B. J. EDWARDS ET AL     2,525,290

VIEW FINDER FOR TELEVISION CAMERAS

Filed Dec. 16, 1947

Inventors
BADEN JOHN EDWARDS
LESLIE WALTER GERMANY
By Blair, Curtis & Hayward
Attorney Patented Oct. 10, 1950

2,525,290

UNITED STATES PATENT OFFICE 2,525,290

VIEW FINDER FOR TELEVISION CAMERAS

Baden J. Edwards and Leslie W. Germany, Cambridge, England, assignors to Pye Limited, Cambridge, England, a British company Application December 16, 1947, Serial No. 792,051
In Great Britain December 17, 1946

3 Claims. (Cl. 178—7.2)

It is known to use simple optical view finders in combination with television cameras for sighting the camera on the object to be televised. It is also known to employ an electronic view finder in the form of a monitor cathode ray tube which reproduces the picture originating in the camera.

The present invention consists in a combined optical and electronic view finder for television cameras in which the operator, on looking into the view finder, sees the picture reproduced on the monitor cathode ray tube surrounded by a picture, reproduced through optical view finding means, of the scene immediately surrounding the field of view being televised.

In the preferred form of the invention, the view finder comprises a mirror which is so inclined to the screen of the monitor cathode ray tube that the reflected image of the picture reproduced thereon will be seen by the operator when looking through the eyepiece of the view finder. The mirror is made of such a size that it corresponds substantially to the area of the reflected image seen by the operator through the eyepiece, the area surrounding the mirror being transparent. Optical view finding means are provided which cover a total field of view greater than that of the field of view of the television camera, the field of view seen by the optical view finder being superimposed around the image reflected by the mirror. The mirror may be carried at the centre of a clear glass plate so that the mirror is surrounded by a transparent area of the glass plate through which the surrounding field of view covered by the optical view finder is seen by the operator. The opaque mirror cuts out that part of the field of view of the optical view finder which corresponds to the televised field of view as reproduced by the monitor cathode ray tube, so that the operator sees, in the view finder, the composite view of the televised field of view reflected in the mirror and the surrounding field of view through the clear glass plate.

By means of the view finder according to this invention, the operator is enabled to see the scene immediately surrounding the televised field of view, thus enabling him to avoid adjacent obstacles when moving the camera and providing him with advance information of objects towards which he may intend to direct the camera.

In order that the invention may be more clearly understood, reference will now be made to the accompanying drawings, in which.

Figure 1:
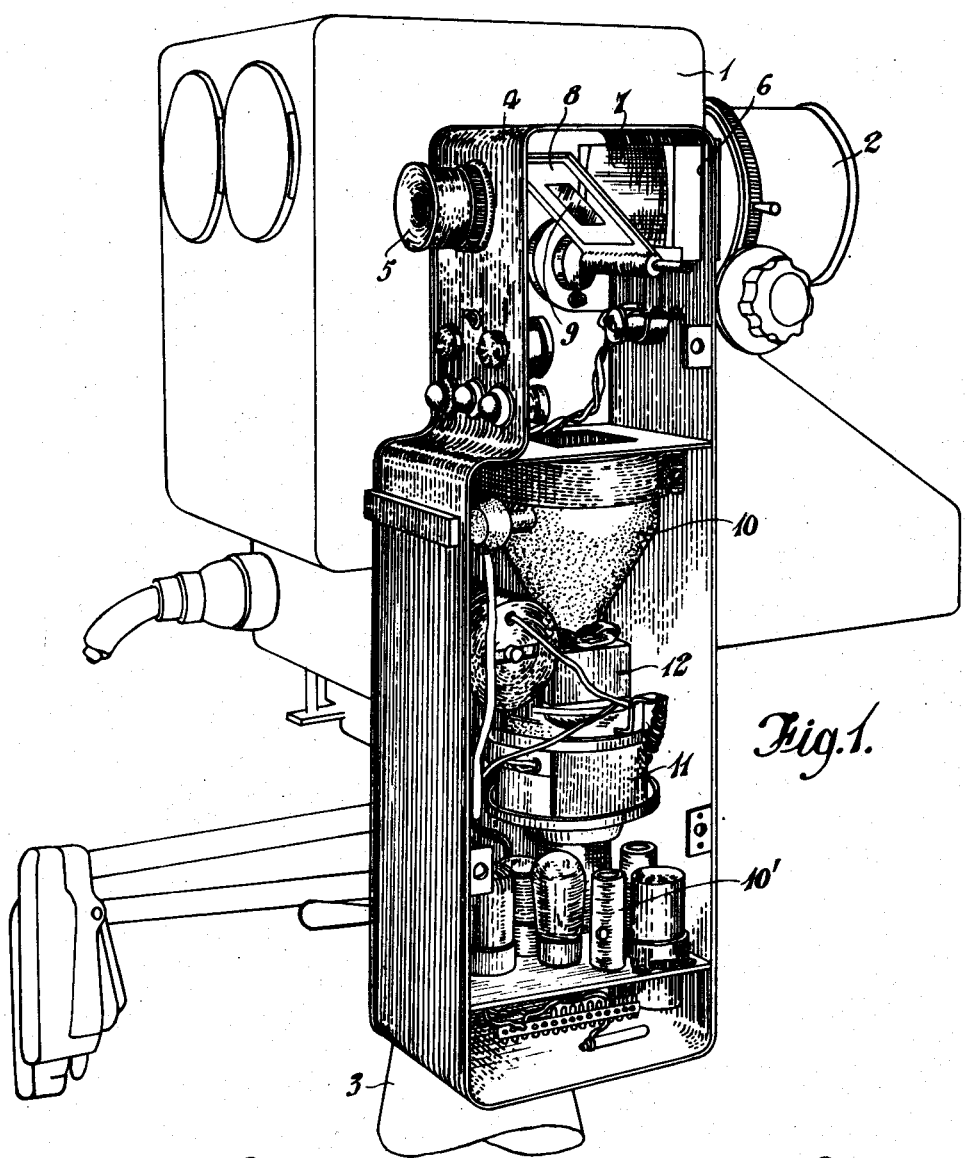
Figure 1 shows a perspective view of a television camera provided with a view finder according to this invention.

Referring to Figure 1, the television camera 1 is provided with the usual camera lens 2 and is mounted for movement about horizontal and vertical axes at the top of a pillar 3. The view finder is accommodated in a casing 4 carried at one side of the camera. In the drawing the cover plate for the casing 4 has been removed in order to show the construction and arrangement of the components of the view finder.

In the back wall of the view finder casing 4 and adjacent the top thereof is an eyepiece 5 arranged in alignment with an aperture 6 in the front wall of the casing behind which is arranged a plano-convex lens 7. The axis of the eyepiece 5 is disposed at the same vertical height as the axis of the camera lens 2. The direct optical field of view seen through the eyepiece 5, the lens 7 and the opening 6 is greater than the field of view of the television camera.

Between the eyepiece 5 and the lens 7 is arranged a transparent glass plate 8 having a mirror surface 9 at its centre. The glass plate 8 is disposed at an angle of 45° to the axis of the eyepiece 5 and the mirror surface 9 is of rectangular shape and disposed uniformly about the axis of the eyepiece.

In the lower portion of the casing 4 is disposed the monitor cathode ray tube 10 with its screen facing vertically upwards and coaxially with the centre of the mirror surface 9. The lower portion of the casing 4 also accommodates the amplifying and control circuits, generally indicated at 10', for feeding a proportion of the output from the camera to the monitor cathode ray tube. 11 is the focussing coil and 12 the deflecting coils surrounding the neck of the monitor cathode ray tube.

Figure 2:
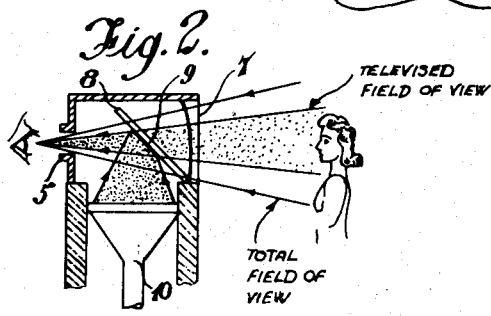
Figure 2 is a diagram explaining the function of the view finder.
Figure 3:
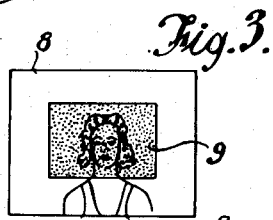
Figure 3 is a diagram showing the picture seen by the operator through the view finder.

The operation of the view finder will be more clearly understood from the diagram shown in Figure 2. From this it will be seen that the picture reproduced on the screen of the monitor cathode ray tube 10, which corresponds to the picture originating in the camera, is reflected by the mirror surface 9 into the eyepiece 5. The mirror surface 9 is made of such a size that it corresponds substantially to the area necessary for reflecting only the picture on the screen of the monitor cathode ray tube into the eyepiece. The area surrounding this mirror 9 is clear glass, so that the scene immediately surrounding the televised field of view is seen directly by the operator through this clear glass surround and the lens 7 of the optical view finder which, as mentioned above, is designed to cover a field of view greater than the televised field of view. The opaque mirror 9 cuts out that portion of the field of view picked up by the optical view finder which corresponds to the televised field of view as reflected in the mirror. The resulting composite picture as seen by the operator is illustrated in Figure 3, from which it will be clearly seen that the operator is provided with advance information on objects in the field of view immediately surrounding the televised field of view, which advance information enables him to direct the camera to avoid obstacles which must not be televised or towards the objects to be brought within the televised field of view.

Whilst a particular embodiment according to the invention has been described, it will be understood that various modifications may be made without departing from the spirit of the invention. For example, the aperture corresponding to the opening 6 in the embodiment described of the optical view finder need not be in direct alignment with the eyepiece but can be disposed in any desired position, appropriate reflectors or the like being provided to direct the light to the eyepiece. Further, the field of view covered by the optical view finder can be reflected into the eyepiece by means of an inclined mirror, the central area of which is transparent or completely removed to provide an area through which the picture reproduced on the monitor cathode ray tube may be projected on to the eyepiece.

We claim:

1. In combination, a television camera movably mounted on a support and a view finder carried by said camera and movable therewith, said view finder comprising an eye aperture and optical system covering a field of view greater than that covered by the television camera, a monitor cathode ray tube, means for reproducing on said monitor cathode ray tube a picture corresponding to the picture originating in the camera, a mirror interposed in the path of the light beam of the optical view finder and so disposed as to reflect the picture reproduced by the monitor cathode ray tube into the eye aperture, the said mirror being only of the size requisite for reflecting the whole of the picture reproduced by the monitor cathode ray tube into the eye aperture.

2. In combination a television camera movably mounted on a support and a view finder carried by said camera and movable therewith, said view finder comprising an eyepiece and optical system covering a field of view greater than that covered by the television camera, a monitor cathode ray tube, means for reproducing on said monitor cathode ray tube a picture corresponding to the picture originating in the camera, a transparent plate disposed in the path of the light beams of the optical view finder, and a mirror of smaller dimensions than said plate and disposed adjacent the centre thereof, said mirror being arranged at such angles with respect to the monitor cathode ray tube and the eyepiece of the view finder that the picture reproduced on the monitor cathode ray tube is reflected by the mirror into the eyepiece.

3. A view finder for television cameras comprising an eyepiece and optical system covering a field of view greater than that to be televised, a monitor cathode ray tube for reproducing a picture corresponding to the picture originating in the camera, a transparent plate disposed in the path of the light beams of the optical view finder, and a mirror surface of smaller dimensions than the transparent plate and formed on the transparent plate, said plate being arranged at such angles with respect to the monitor cathode ray tube and the eyepiece of the view finder that the picture reproduced on the monitor cathode ray tube is reflected by the mirror into the eyepiece, the dimensions of said mirror surface being substantially such that the picture reflected thereby as seen from the eyepiece occupies substantially the entire area thereof.

BADEN J. EDWARDS.
LESLIE W. GERMANY.

REFERENCES CITED

The following references are of record in the file of this patent:

UNITED STATES PATENTS

| Number | Name | Date |
|---|---|---|
| 2,061,378 | Henze et al. | Nov. 17, 1936 |
| 2,165,402 | Mihalyi | July 11, 1939 |
| 2,284,831 | McCanlies | June 2, 1942 |
| 2,403,628 | Beers | July 9, 1946 |
| 2,420,197 | Rosenthal | May 6, 1947 |
| 2,420,198 | Rosenthal | May 6, 1947 |